United States Patent [19]

Tuckey

[11] Patent Number: 4,747,388

[45] Date of Patent: May 31, 1988

[54] IN-TANK FUEL RESERVOIR AND FILTER DIAPHRAGM

[75] Inventor: Charles H. Tuckey, Cass City, Mich.

[73] Assignee: Walbro Corporation, Cass City, Mich.

[21] Appl. No.: 928,184

[22] Filed: Nov. 7, 1986

[51] Int. Cl.⁴ .......................................... F02M 37/10
[52] U.S. Cl. .................................. 123/514; 123/510; 137/574
[58] Field of Search ............... 123/510, 514, 516, 509; 137/566, 574, 576, 907; 251/243; 73/304 C

[56] References Cited

U.S. PATENT DOCUMENTS

| | | | |
|---|---|---|---|
| 1,493,612 | 5/1924 | Denison | 417/424 |
| 2,370,590 | 2/1945 | Taylor | 417/424 X |
| 3,294,025 | 12/1966 | Niemeyer et al. | 417/424 X |
| 4,309,155 | 1/1982 | Heinz et al. | 417/360 |
| 4,363,214 | 12/1982 | Kiser | 137/574 X |
| 4,397,333 | 8/1983 | Liba et al. | 123/514 X |
| 4,417,472 | 11/1983 | Tward | 73/304 C |
| 4,503,885 | 3/1985 | Hall | 137/574 |
| 4,546,750 | 10/1985 | Brunell et al. | 123/514 |
| 4,617,116 | 10/1986 | Seiler | 123/514 X |
| 4,672,937 | 6/1987 | Fales et al. | 123/516 X |

FOREIGN PATENT DOCUMENTS 2844053 4/1980 Fed. Rep. of Germany ...... 123/509
11666 of 1900 United Kingdom ................ 123/510
2172864 10/1986 United Kingdom .

Primary Examiner—Tony M. Argenbright
Assistant Examiner—Eric R. Carlberg
Attorney, Agent, or Firm—Barnes, Kisselle, Raisch, Choate, Whittemore & Hulbert

[57] ABSTRACT

A fuel system for automotive vehicles including a main liquid fuel tank which has a vertical fuel canister within the tank containing an electrically powered fuel pump. The canister has an open bottom positioned at the bottom of the fuel tank. The pump delivers liquid fuel from an inlet at the bottom of the canister to the engine and a pressure regulator in the line diverts fuel above the required volume back to the top of the canister which has an overflow to the main tank. The canister, which serves as a fuel reservoir, has a bottom septum closed by a movable valve. A filter material extends over the bottom of the canister to filter fuel entering the pump inlet. The filter is mechanically associated centrally with a spring biased lever connected to the movable valve. Under conditions where the bottom of the canister is starved of liquid fuel, the filter acts as a diaphragm to shift the lever against the resilient bias and open the valve to admit reservoir fuel from the canister to the pump inlet.

17 Claims, 3 Drawing Sheets

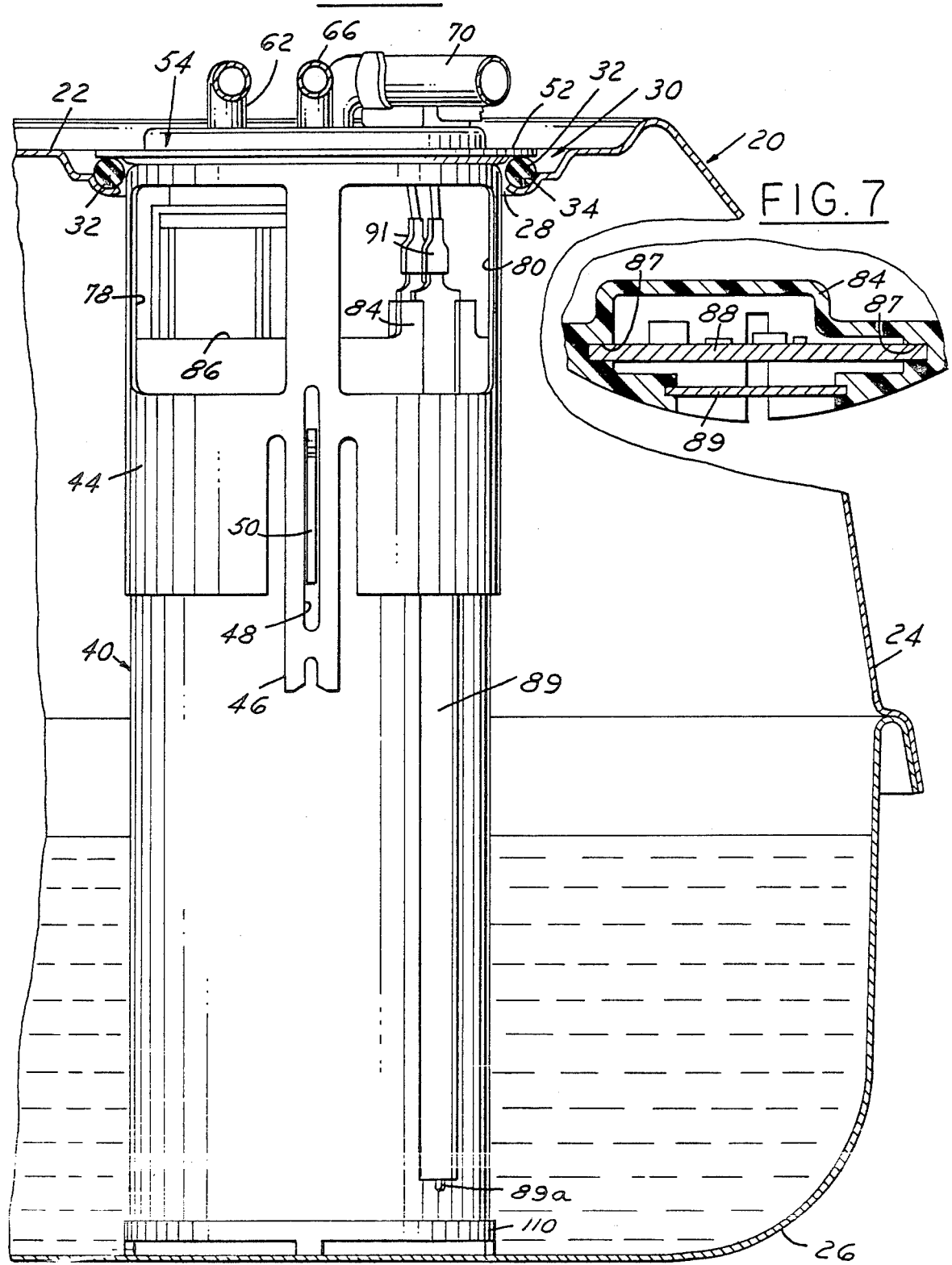

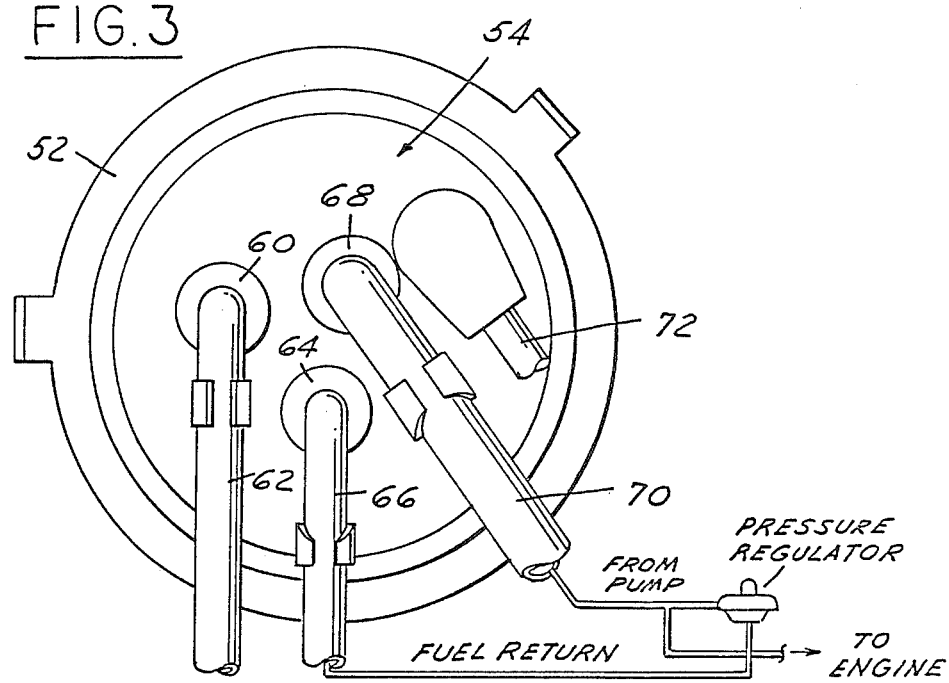
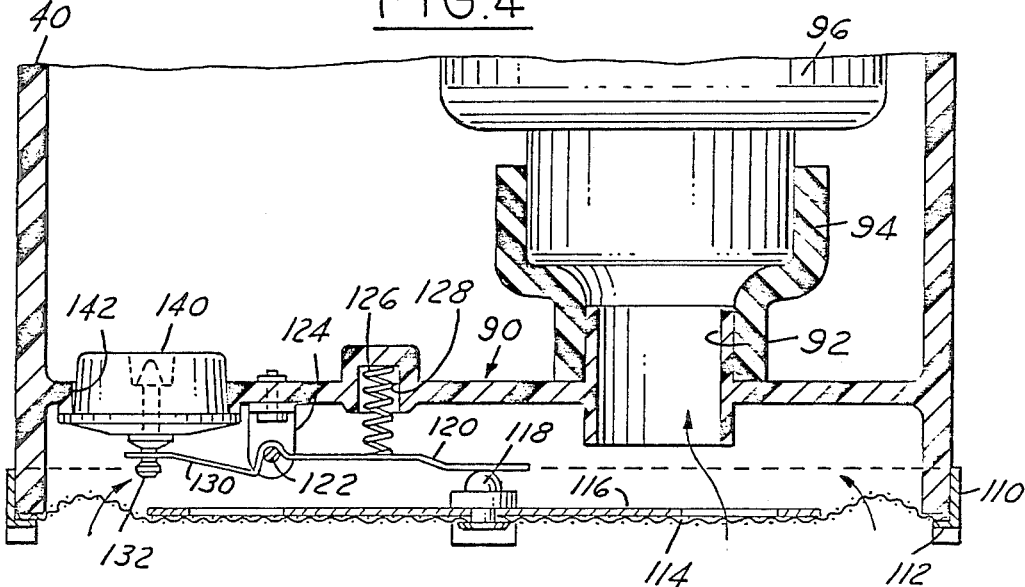
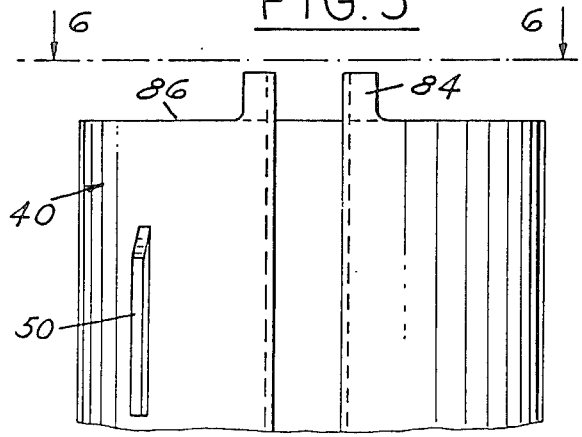
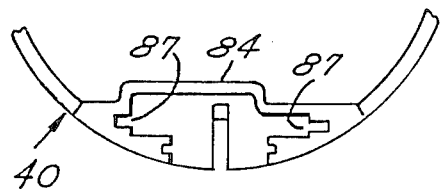

IN-TANK FUEL RESERVOIR AND FILTER DIAPHRAGM

FIELD OF INVENTION

Fuel systems for internal combustion engines in which an in-tank pump is utilized along with an in-tank reservoir in which the pump is located.

BACKGROUND AND OBJECTS OF THE INVENTION

In automotive vehicles in which a fuel pump is installed in a fuel tank, the pump inlet is located at the bottom of the tank. When the fuel level is low, the cornering of a vehicle may cause sloshing of the fuel to one side or the other and cause admission of air to the pump inlet. This may cause a fuel interruption and a stall-out.

The present invention provides for a vertical reservoir in the tank and the positioning of the pump in the reservoir with the inlet adjacent the bottom of the reservoir. A filter is movably mounted adjacent the bottom of the reservoir to control an inlet valve.

The object of this design is to insure that an adequate fuel supply will reach the pump if there is a fast cornering or a steep ascent or descent which would temporarily starve the fuel inlet when the fuel supply in the tank is low, e.g., less than a gallon.

Another object is the feeding of fuel from the reservoir only when there is no fuel available through the main inlet filter, or under other unusual circumstances, such as water in the tank.

A further object of the invention is the provision of a fuel reservoir in the tank and a vertical standpipe formed in part thereof to provide a fuel tower and to contain a fuel level sensor which will register the volume of fuel in the main tank independent of the fuel in the reservoir. As a significant cost reduction, one wall portion of the fuel tower can be formed by one element of the fuel sensor, thus providing a vertical inexpensive sensor chamber.

Another object is the utilization of the pump recirculation fluid to maintain the fuel in the reserve reservoir independent of the fuel level in the main tank.

Other objects and features of the invention will be apparent in the following description and claims in which the principles of the invention are set forth together with details to enable a person skilled in the art to practice the invention, all in connection with the best mode presently contemplated for the invention.

BRIEF DESCRIPTION OF THE DRAWINGS

Drawings accompany the disclosure and the various views thereof may be briefly described as:

FIG. 2, an outside elevation of the fuel reservoir installed in a fuel tank;

FIG. 3, a top view of the reservoir mounting cover;

FIG. 4, an enlarged view of the working mechanism at the base of the reservoir;

FIG. 5, a fragmented view of a portion of the top of the reservoir;

FIG. 6, a partial section on line 6—6 of FIG. 5; and

FIG. 7, an enlarged sectional view of the fuel sensor tower.

DETAILED DESCRIPTION OF THE INVENTION AND THE MANNER AND PROCESS OF USING IT

Figure 1:
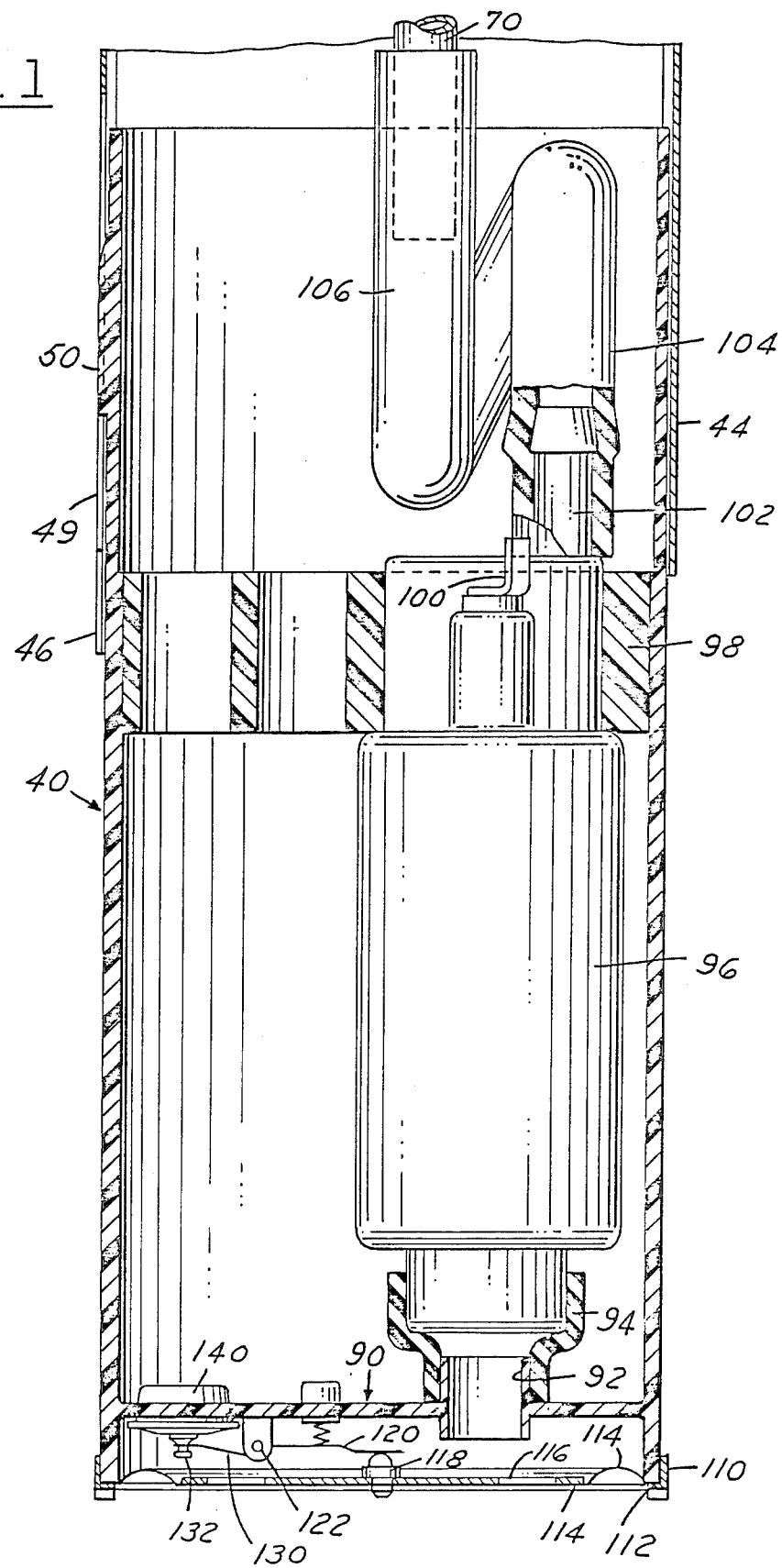
FIG. 1, a sectional view of the vertical reservoir showing the fuel pump and control valve.

With reference, first, to FIG. 2, a fuel tank 20 of a vehicle is partially shown in section with a top wall 22, a side wall 24 and a bottom wall 26. The top wall has a circular opening 28 within a depressed area 30 and an O-ring 32 is carried in a shallow annular trough 34.

Mounted in the tank within the opening 28 is a vertical reservoir 40 composed of a generally cylindrical canister and an upper sleeve locator shell 44 in telescopic relation to the canister 40. A spring (not shown) biases a pump to be described and the canister 40 downward against the bottom 26 of the tank. The parts are circumferentially oriented by a slotted longitudinal tab 46 with a slot 48. An elongate lug 50 is introduced into the slot 48 to orient the canister 40 and the locator sleeve 40. A circular flange 52 on a top cover 54 rests on the O-ring 32 in the tank opening to seal the tank. The top cover portion 54 is shown in a plan view in FIG. 3 and this cover supports the locator shell 44.

With reference to FIG. 3, the top cover has four fixtures. A roll-over stop valve (not shown) in a vent passage 60 with a connector tube 62 is shown at the left. A fuel return connector 64 and associated conduit 66 is provided. A fuel pump outlet 68 and conduit 70 lead to the engine. A conduit 72 for the electric pump connection and the fuel level sensor is provided at the right side of the cover as viewed in FIG. 3.

The locator sleeve 44, shown in elevation in FIG. 2, has two windows 78 and 80, through which window 80 may be viewed the top of the canister 40. The canister 40 has also a fuel sensor tower 84 formed in the exterior wall extending along the side of the canister 40 and with the top above the top 86 of the canister 40. The top 86 provides a spillover edge for the reservoir. The tower 84 has formed therein opposed grooves 87 to receive and stabilize a plate 88 carrying sensor elements for fuel level. A second element 89 of the sensor circuit (FIG. 7) comprises an elongate electrode mounted parallel to the plate 87 in opposed grooves in the tower 84. This element closes the tower on the tank side. A small fuel opening 89a at the bottom of electrode 89 admits fuel to the sensor tower 84 from the main tank.

As shown in FIGS. 1 and 4, the base of the canister 40 has a raised support septum 90 with an integral short tube 92 extending above and below. A resilient connector nipple 94 supports the bottom of an electric pump 96. As shown in FIG. 1, the top end of the pump is mounted in a resilient collar 98 a little above the middle of the canister 40. This collar is retained within the inner walls of the canister 40. The pump has an electrical connector 100 and a fuel outlet 102 connected to the fuel lines 104, 106 and conduit 70. A fuel return tube 64 connected to tube 66 is located within the canister top (FIG. 3) extending to a point adjacent the septum 90 at the bottom of the canister.

Referring again to the FIGS. 1 and 4, a ring 110 fits snugly over the lower end of canister 40 and is formed with an inner flange 112. A circular disc of filter material 114 has its periphery locked tightly between the bottom edge of the canister wall and this inner flange 112. A reinforcing perforated disc 116 overlies the central portion of the filter but allows fuel to pass through the major area of the filter. On the disc 116 is a rounded button 118 which secures the disc to the screen and serves as a rounded contact for one end of a valve lever 120. This lever 120 is pivoted at 122 on a dependent bracket 124 mounted on septum 90.

A spring 126 seated in a cavity 128 bears against the lever 120 on one side of the pivot 122. A birfurcate end 130 on the other side of the pivot engages a bottom projection 132 on a valve 140 in a circular valve seat opening having an annular valve seat 142. The valve is provided with an annular flange to cooperate with the valve seat.

IN THE OPERATION

During normal operation of the fuel system when the tank 20 has an ample quantity of fuel, the pump 96 will be receiving fuel through the inlet 92 which is open to the bottom of the reservoir canister 40. Fuel flows freely through the filter 114 and the support plate 116 in the same manner as if the filter were a stationary element.

Fuel flows out of the line 70 to the engine being supplied. A pressure regulating valve (FIG. 3) is usually positioned in the fuel line and this valve by-passes fuel above a predetermined pressure back to the tank overflow line 66 and continues on to the tube 64 to the canister 40. When the canister is full, excess fuel will overflow the top edge 86 to the main tank 20. Thus, under normal conditions, there will be fuel in the main tank and in the reservoir canister 40.

A fuel level sensor consisting of two elements 88 and 89 are incorporated in the sensor tower 84 as shown in FIG. 7 and connected by the terminals 91 into a fuel sensor circuit with a suitable visual response at the vehicle dashboard.

Reference is made to copending applications assigned to the assignee of the present application, in the name of James S. Baughman, Ser. No. 903,149, filed Sept. 3, 1986, and Ser. No. 912,434, filed Sept. 29, 1986, and directed to Capacitance Type-Material Level Indicator.

Under circumstances when the fuel supply in the main tank 20 has been depleted to a gallon or less, it will still cover the filter 114 in the bottom of the canister. However, if there is a fast cornering of the vehicle or a steep ascent or descent, the fuel in the main tank will move to one side or the other of the lower end of the canister and the screen diaphragm will be starved of fuel. This filter material could be made of fine flexible wire mesh but is preferably formed of a plastic mesh of woven strands or a similar material with small openings which when wet will resist the flow of air because of capillary action. Under these conditions, air in the main tank will try to pass through the filter material. The wet filter will reject the passage of air due to the liquid capillary seal of the wet filter material. The pressure drop above the filter created by the pump will then cause the filter to act as a diaphragm to move it upward. This motion will actuate the lever 120 against the spring 126 to open the valve 140. Fuel may then flow from the reservoir canister to the pump inlet to keep fuel flowing to the engine. When fuel is again available to the filter diaphragm, it will act as a stationary filter.

Thus, there is a reservoir of fuel available for use under conditions of low fuel level in the main tank. This reservoir will also supply fuel when the main tank is empty and may contain enough fuel to carry the vehicle some distance before it is entirely depleted. Also, if water gains access to the main fuel tank, it goes to the bottom and should it reach the filter diaphragm, it will also cause the diaphragm to respond to the pump inlet pressure because of its higher viscosity compared to gasoline. Thus, the fuel in the reservoir will be furnished to the engine until it is exhausted.

A separate diaphragm can be connected to the valve lever 120 responsive to lowered pressure in the chamber between a stationary filter and the septum 90. In this case, the resistance to the passage of air or water at the filter would lower the pressure above the filter and cause the separate diaphragm to open the fuel release valve to admit fuel to the pump inlet. Similarly, a pressure responsive valve which is biased to a closed position could be actuated by the reduced pressure to admit fuel from the reservoir to the pump inlet.

I claim:

1. In a fuel system for an automotive vehicle having a liquid fuel tank, a powered fuel pump, and a pressure regulator to limit the pressure and volume of fuel delivered to an engine of the vehicle, the improvement which comprises a reservoir canister having a base at the bottom of the fuel tank to receive return fuel from the pressure regulator, a pump associated with in said canister with an inlet adjacent to the bottom of the canister and the bottom of the fuel tank, means to contain return fuel in said canister, a valve to open said return-fuel-containing means to admit fuel to the inlet of said pump, and means to open said valve in response to the absence of liquid fuel at the base of said canister.

2. A fuel system as defined in claim 1 in which said means to open said valve comprises a diaphragm composed of a sheet of material having a multiplicity of fine, closely spaced openings which will be closed by capillary action of a liquid fuel to resist passing of air or water.

3. A fuel system as defined in claim 1 in which said means to contain return fuel in said canister comprises a septum wall above the bottom of said canister having an opening in which said pump inlet is positioned, and a valve opening to cooperate with said valve.

4. A fuel system as defined in claim 2 in which said diaphragm comprises a fuel filter sheet closing the bottom of said canister below said pump inlet.

5. A fuel system as defined in claim 3 in which a valve seat is provided in said valve opening in said septum wall and said valve is biased against said seat to contain fuel in said canister.

6. A fuel system as defined in claim 5 in which said valve is mounted on one end of a lever pivoted on said septum, spring means acting on the other end of said lever to bias said valve to a closed position against said seat, and means connecting said other end of said lever with a diaphragm whereby movement of said diaphragm will open said valve and admit fuel in said canister to said pump inlet.

7. A fuel system as defined in claim 2 in which said diaphragm is formed of a filter material to serve as a filter for fuel entering said pump inlet when fuel is surrounding said filter material above and below the surface thereof and said filter material moves in response to reduced pressure in said pump inlet and in absence of fuel below the filter to move said lever against the bias of said spring means and open said valve.

8. A fuel system as defined in claim 1 in which said canister carries a vertical tube open to the fuel in said fuel tank, and electrodes associated with said tube to connect to an electrical response system to indicate fuel level in said fuel tank.

9. In a fuel system as defined in claim 1, a fuel sensor tower formed in the side wall of said canister extending from a point adjacent the bottom of said tank to a point adjacent the top of said tank, a fuel opening at the base of said tower to admit fuel from said tank to said tower, and spaced elongate sensor elements positioned in said tower to associate with an electrical sensor circuit to register fuel level in said tank.

10. A fuel system as defined in claim 9 in which said tower has a vertical opening on the outer wall thereof, and one of said sensor elements closes said opening to provide a closed fuel tower open at the bottom to fuel in said tank.

11. A fuel system as defined in claim 8 in which said fuel sensor tower extends above the top level of said reservoir canister so fuel spilling over the top of said canister will not enter said tower.

12. A liquid fuel supply for automotive vehicles comprising a canister having a lower end with an opening and an interior wall spaced from said lower end to form a fuel reservoir above said wall and a separate chamber below said wall, a fuel pump positioned within said reservoir and having an inlet coupled through said interior wall to said separate chamber, diaphragm means extending across said opening and being characterized by permitting free passage of liquid fuel therethrough while being closed by surface tension of liquid fuel to restrict passage of air therethrough, a valve carried by said wall for selectively coupling said reservoir to said separate chamber, and means responsive to absence of fuel at said opening for selectively opening said valve and thereby permitting flow of fuel from said reservoir to said chamber.

13. The fuel supply set forth in claim 12 wherein said diaphragm means comprises a filter screen.

14. The fuel supply set forth in claim 12 wherein said diaphragm means is carried by said canister across said opening for motion into and out of said chamber as a function of pressure drop across said diaphragm means, and wherein said absence-responsive means comprises means responsive to motion of said diaphragm means into said chamber for opening said valve.

15. The fuel supply set forth in claim 14 wherein said absence-responsive means comprises a lever having end and intermediate coupling means, one of said coupling means being coupled to said canister for rotation with respect thereto, a second of said coupling means being coupled to said diaphragm means and a third of said coupling means being coupled to said valve means.

16. A fuel supply system comprising a container formed by a cover and a housing, which container is constructed to be mounted from above through a fuel tank opening to extend down to the tank bottom and containing an electrical fuel pump whose connecting pipe projects into an intermediate space formed by a fixed bottom and a subjacent filter, a pressure line connected to the fuel pump and leading out of the container, and a return line opening into a container chamber provided above the intermediate space, the chamber communicating with the intermediate space via drain means in the bottom, the drain means being constructed such that the amount of fuel draining therethrough is smaller than that supplied through the return line, and the filter having a mesh size characterized in that low pressure produced in the intermediate space by the fuel pump is smaller than the surface tension of the fuel in the filter.

17. A fuel supply system as in claim 16 wherein said drain means in the bottom comprises a valve.

* * * * *